United States Patent
Egge et al.

(10) Patent No.: US 10,111,413 B2
(45) Date of Patent: Oct. 30, 2018

(54) METHOD AND DEVICE FOR TAKING UP FISH FROM A BODY OF WATER

(71) Applicant: Sea Soul AS, Fyllingsdalen (NO)

(72) Inventors: Mats Abraham Egge, Fyllingsdalen (NO); Tore Willassen, Oslo (NO)

(73) Assignee: Sea Soul AS, Fyllingsdalen (NO)

( * ) Notice: Subject to any disclaimer, the term of this patent is extended or adjusted under 35 U.S.C. 154(b) by 286 days.

(21) Appl. No.: 15/112,825

(22) PCT Filed: Jan. 21, 2015

(86) PCT No.: PCT/EP2015/051052
§ 371 (c)(1),
(2) Date: Jul. 20, 2016

(87) PCT Pub. No.: WO2015/110441
PCT Pub. Date: Jul. 30, 2015

(65) Prior Publication Data
US 2016/0330943 A1    Nov. 17, 2016

(30) Foreign Application Priority Data
Jan. 21, 2014  (NO) .................................. 20140066

(51) Int. Cl.
*A01K 79/00* (2006.01)
*A01K 61/13* (2017.01)
(Continued)

(52) U.S. Cl.
CPC .............. *A01K 79/00* (2013.01); *A01K 61/13* (2017.01); *A01K 61/60* (2017.01); *A01K 61/90* (2017.01);
(Continued)

(58) Field of Classification Search
CPC ........ A01K 61/60; A01K 61/70; A01K 61/90; A01K 79/00; Y02A 40/812; Y02A 40/83; Y02A 40/826; E02B 8/08; E02B 8/085
See application file for complete search history.

(56) References Cited

U.S. PATENT DOCUMENTS 2,363,154 A * 11/1944 Smith ....................... E02B 8/00
                                                     405/83
3,038,760 A *  6/1962 Crooke ................... A01K 79/00
                                                     119/203
(Continued)

FOREIGN PATENT DOCUMENTS

EP        0311879 A1    4/1989
FR        2666960 A1    3/1992
(Continued)

OTHER PUBLICATIONS

Been, Mathieu, "International Search Report," prepared for PCT/EP2015/051052, dated May 28, 2015, five pages.

*Primary Examiner* — Michael H Wang
(74) *Attorney, Agent, or Firm* — Winstead PC

(57) ABSTRACT

A method for taking fish up from a body of water comprising the steps of providing a duct (14) having a lower open end below the water surface and an upper open end arranged at a floating working platform (5) above sea level; introducing water into the duct (14) from the upper open end to give a water stream from the upper open end of the duct to the lower open end of the duct; and allowing the fish to swim up in the duct against the water stream therein. The incoming water is directed to flow into the duct, and the fish is separated from the flowing by means of a grating (16) inclining upwards from the top end of the duct to a separation plate (17) arranged above the water level in the duct. A device for taking up fish, using the mentioned method is also described.

15 Claims, 4 Drawing Sheets

(51) Int. Cl.
*A22C 25/02* (2006.01)
*A22C 25/04* (2006.01)
*A01K 61/90* (2017.01)
*A01K 61/60* (2017.01)

(52) U.S. Cl.
CPC .............. *A22C 25/02* (2013.01); *A22C 25/04* (2013.01); *Y02A 40/81* (2018.01); *Y02A 40/826* (2018.01)

(56) References Cited

U.S. PATENT DOCUMENTS

| | | | | |
|---|---|---|---|---|
| 3,293,862 | A * | 12/1966 | Harding | E02B 8/00 405/81 |
| 3,552,054 | A * | 1/1971 | Hansen | A01K 79/00 43/6.5 |
| 4,260,286 | A * | 4/1981 | Buchanan | E02B 8/08 405/82 |
| 4,629,361 | A * | 12/1986 | Zimmerman | E02B 8/08 405/83 |
| 4,740,105 | A * | 4/1988 | Wollander | E02B 8/08 405/83 |
| 5,171,101 | A * | 12/1992 | Sauerbier | A63B 69/00 405/79 |
| 5,667,445 | A * | 9/1997 | Lochtefeld | A63G 21/18 472/117 |
| 6,325,570 | B1 * | 12/2001 | Pohjamo | E02B 8/08 405/81 |
| 8,262,317 | B1 * | 9/2012 | Jensen | E02B 8/08 405/83 |
| 8,550,749 | B2 * | 10/2013 | Millard | E02B 8/08 405/83 |
| 9,217,232 | B2 * | 12/2015 | Stromotich | E02B 8/08 |
| 9,629,343 | B1 * | 4/2017 | Sallaberry | E02B 8/08 |
| 2003/0219311 | A1 * | 11/2003 | Hildstad | E02B 8/08 405/81 |
| 2010/0086357 | A1 * | 4/2010 | Don | E02B 8/08 405/81 |
| 2014/0356070 | A1 * | 12/2014 | Stromotich | E02B 8/08 405/83 |
| 2016/0076212 | A1 * | 3/2016 | Monai | E02B 8/08 |
| 2017/0138008 | A1 * | 5/2017 | Chen | E02B 8/08 |
| 2017/0241093 | A1 * | 8/2017 | Bertrand | E02B 8/08 |

FOREIGN PATENT DOCUMENTS

| | | |
|---|---|---|
| GB | 2299920 A | 10/1996 |
| SE | 527974 C2 | 7/2006 |
| WO | WO-9417657 A1 | 8/1994 |
| WO | WO-9515079 A1 | 6/1995 |
| WO | WO-9941976 A2 | 8/1999 |

* cited by examiner

METHOD AND DEVICE FOR TAKING UP FISH FROM A BODY OF WATER

TECHNICAL FIELD

The present invention relates to a method and device for taking up fish from a body of water for slaughtering, control, scientific examination, treatment and/or transfer to a net cage, transport container or the like. A specific embodiment of the invention relates to fish farming.

BACKGROUND ART

Fish is often held in net cages in industrial farming in coastal districts. The mostly used net cages comprises a ring formed floater onto which a fastened to define and enclosure for the fish to be cultured therein. The fish is kept at a relatively high density in the net cage and has to be treated to avoid parasites, such as salmon louse and other illnesses at planned intervals or according to the need thereof. The treatment may be performed by taking up the fish for injections, or by covering the net cage by means of an outer bag shaped impermeable tarpaulin or the like, and mixing in chemicals for treatment of the fish into the water inside of the tarpaulin.

Both for taking up fish and for treatment inside the net cage covered by an impermeable tarpaulin or the like, the volume inside of the net cage has to be reduced to further increase the density of the fish inside the net cage. This is done by partly lifting up the net cage to reduce the volume thereof. The lifting of the net cage requires lifting equipment as cranes and the like that are expensive in use and exposes the net cage for physical stress that may damage the equipment. The reduction of volume may cause stress with the fishes inside the net cage, and even physical damage to the fish due to the increased fish density.

Normally, specialized pumps are used for taking up the fish. The pumps do also expose the fish for further physical damage and further stress, which may also result in increased mortality. If the fish is taken up for slaughtering, the physical damage and stress may have effect on the quality of the fish and thus the sales value thereof.

For in situ treatment against e.g. salmon louse using an impermeable tarpaulin or the like outside the net cage, time is an important issue as the chemical used are poisonous to the fish by long time exposure, and as the tarpaulin reduces or even stops the introduction of fresh oxygen rich water into the net cage. The treatment time is a compromise between obtaining a sufficient treatment time and reducing the poisoning and/or drowning (i.e. dying due to lack of oxygen) of the fish to a minimum.

Methods and allowing migrating fishes between waters separated from each other's, or where waterfalls prevents fish from swimming upstream, are known from the prior art.

Salmon ladders are well known ways for providing a way for e.g. salmon and trout to pass dams and waterfalls that are too high to pass. A salmon ladder normally comprises several small dams connected by small waterfalls that may be passed upstream by the fish. SE527974 relates to a variant of a salmon ladder where a tubular member is connecting two separate water basins at different levels. The tube has different diameter along the length thereof to obtain a varying velocity of flow in different parts of the tube. GB2299920 relates to a floating fish pass connecting two water basins at different levels, the fish pass being a channel having rectangular cross section, where the fish is allowed to swim upstream in the flowing water.

FR2666960 and US20100086357 both relate to eel passes, comprising a slanting channel having a bottom portion covered with a bristle substrate to imitate grass. The bristle substrate is kept wet by irrigation with water for keeping the bristle substrate sufficiently wet to imitate the wet grass in which eels normally migrate between waters. According to FR2666960, a collecting sump for collecting eel falling over the upper edge of the slanting channel is arranged to collect the eels and to lead the eels into a tubular member to transport the eels together with water to a location where the eels are to be released. It is mentioned that eels may be taken out here for weighing, etc.

An object for the present invention is to provide for a method and a device for taking up fish, such as trout, salmon, char, or any other fish naturally migrating against flowing water, and thereby using the instincts of the fish for transfer of the fish to another net cage or transport container, for treatment and/or control, or for slaughtering, and at the same time avoiding the problems of the prior methods and devices.

Other object will be clear for the skilled person in reading the present description and claims.

SUMMARY OF INVENTION

According to a first aspect, the present invention relates to a A method for taking fish up from a body of water comprising the steps of:
 providing a duct having a lower open end below the water surface and an upper open end arranged at a floating working platform above sea level,
 introducing water into the duct from the upper open end to give a water stream from the upper open end of the duct to the lower open end of the duct, and
 allowing the fish to swim up in the duct against the water stream therein,
wherein the incoming water is directed to flow into the duct, and that the fish is separated from the flowing by means of a grating inclining from the top end of the duct to a separation plate arranged above the water level in the duct.

The instinct of many fish species tells the fish to swim upstream as they do in the nature. Fish swimming upwards will end up at the top of the duct and may be taken from there for control, treatment, sorting, slaughtering, etc. By using the instinct of the fish, the stressful situations as mentioned on the introduction of the description are avoided, both reducing the stress of the fish and situations that may cause physical damage to the fish.

According to a first embodiment, the fish is led from the grating to the separation plate by its own swimming speed, and is led further from the separation plate into a processing duct. By taking advantage of the swimming speed of the fish and only leading the fish onto the separation plate and further into a processing duct, the device may be kept simple and easy to maintain, at the same time as devices that may stress or even damage the fish, may be avoided.

The processing duct may be provided for processing the fish swimming up the present device. One possible process may be that the fish is sprayed with chemicals in aqueous solution in the processing duct.

The fish may alternatively or additionally be sorted according to present parameters in the processing duct. The fish that is released from the processing duct after being sprayed with chemicals and/or sorted may be introduced into one or more cage net (s) and/or containers.

According to one embodiment, the fish is led into a facility for slaughtering of the fish.

According to one embodiment, the body of water is body of water inside of a sea farm enclosure, such as a cage net.

According to a second aspect, the present invention provides a device for taking up fish from a body of water, the device comprising:
- a duct arranged connected to a working platform above sea level where the duct is arranged to be placed with a lower open end at the surface of the water, and an upper open end arranged at the working platform;
- a water source for introducing water into the duct at the upper open end of the duct to give an artificial waterfall through the duct, wherein a grating is arranged upwards inclining from the upper end of the duct to a separation plate arranged above the water level in the duct, for leading the swimming fish from the duct onto the separation plate.

According to one embodiment, the water source is a pumping arrangement is arranged for pumping up water from a depth and introducing the water into the duct.

According to one embodiment, the water pumping arrangement comprises a vertically arranged tube that at is upper end is connected to a water inlet for introduction of water into the duct, and is open in its lower end, and where an air tube is arranged for introduction of air into the lower open end of the tube. This type of pumping device is a simple, and reliable pumping device only needing a compressor or other source of compressed air at the working platform, and no submerged moving parts needing maintenance, making it a cost efficient solution. Water pumped up from a depth is normally colder than the surface water. The cold water combined with introduction of air into the water, give an oxygen rich water in the duct. Fish tends to be attracted by water being more oxygen rich than the water where they are swimming. Accordingly, the use of this kind of pumping device will increase the efficiency of the present device in getting up fish, especially from fish farming cage nets or the like, where fish density may be so high that keeping a sufficiently high oxygen concentration in the water may be a challenge.

According to one embodiment, the device further comprises a processing duct for processing of the fish.

According to one embodiment, the processing duct comprises spray nozzles for spaying of fish with aqueous solutions of chemicals.

According to one embodiment, the processing duct comprises detectors for measuring weight, size, number etc. of the fish passing through the processing duct.

According to another embodiment, the processing duct comprises equipment for injecting medicine and/or identification markers into the fish.

DETAILED DESCRIPTION OF THE INVENTION

Figure 1:
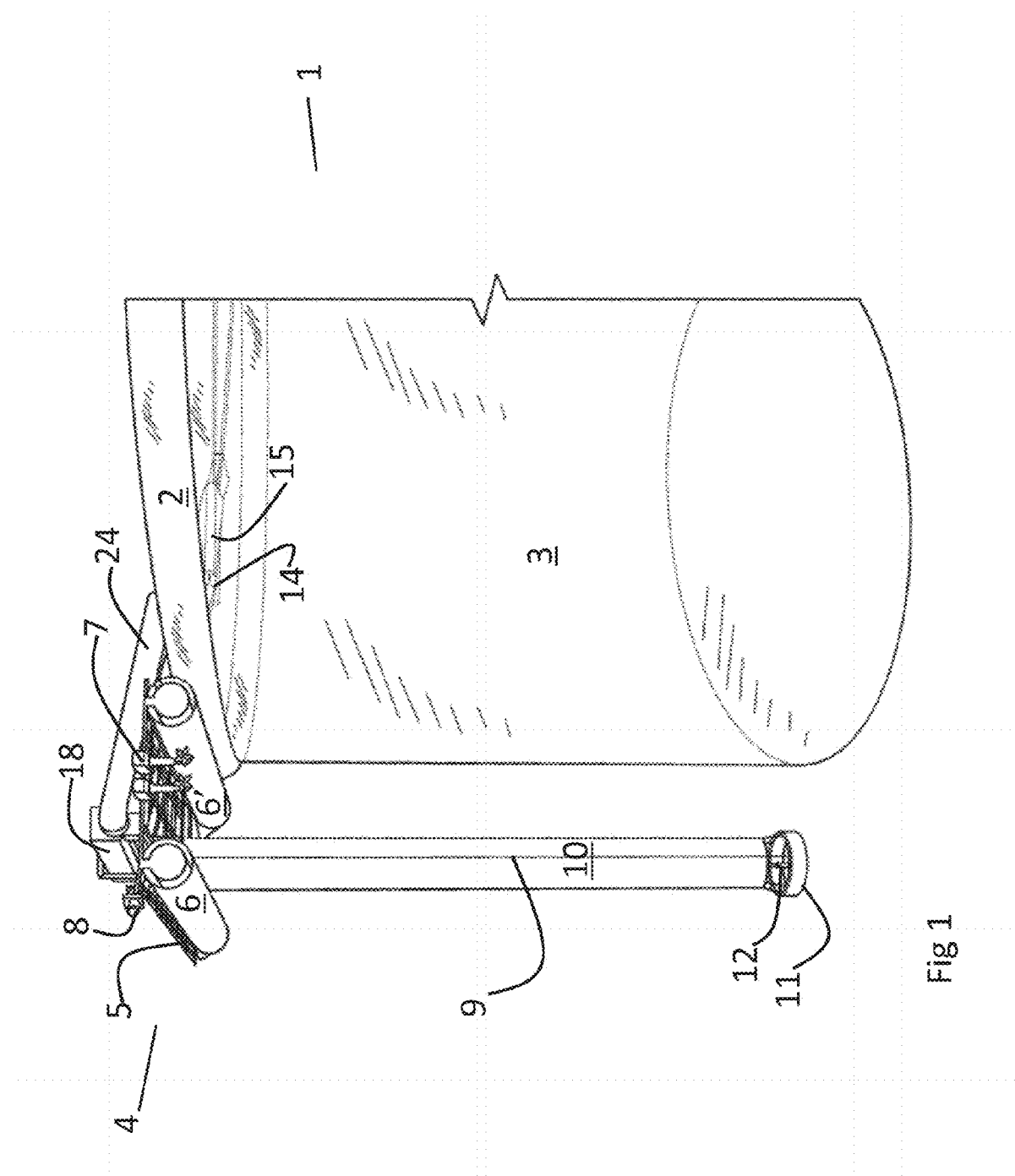
FIG. 1 is a side view of a net cage and a device according to the present invention.
Figure 2:
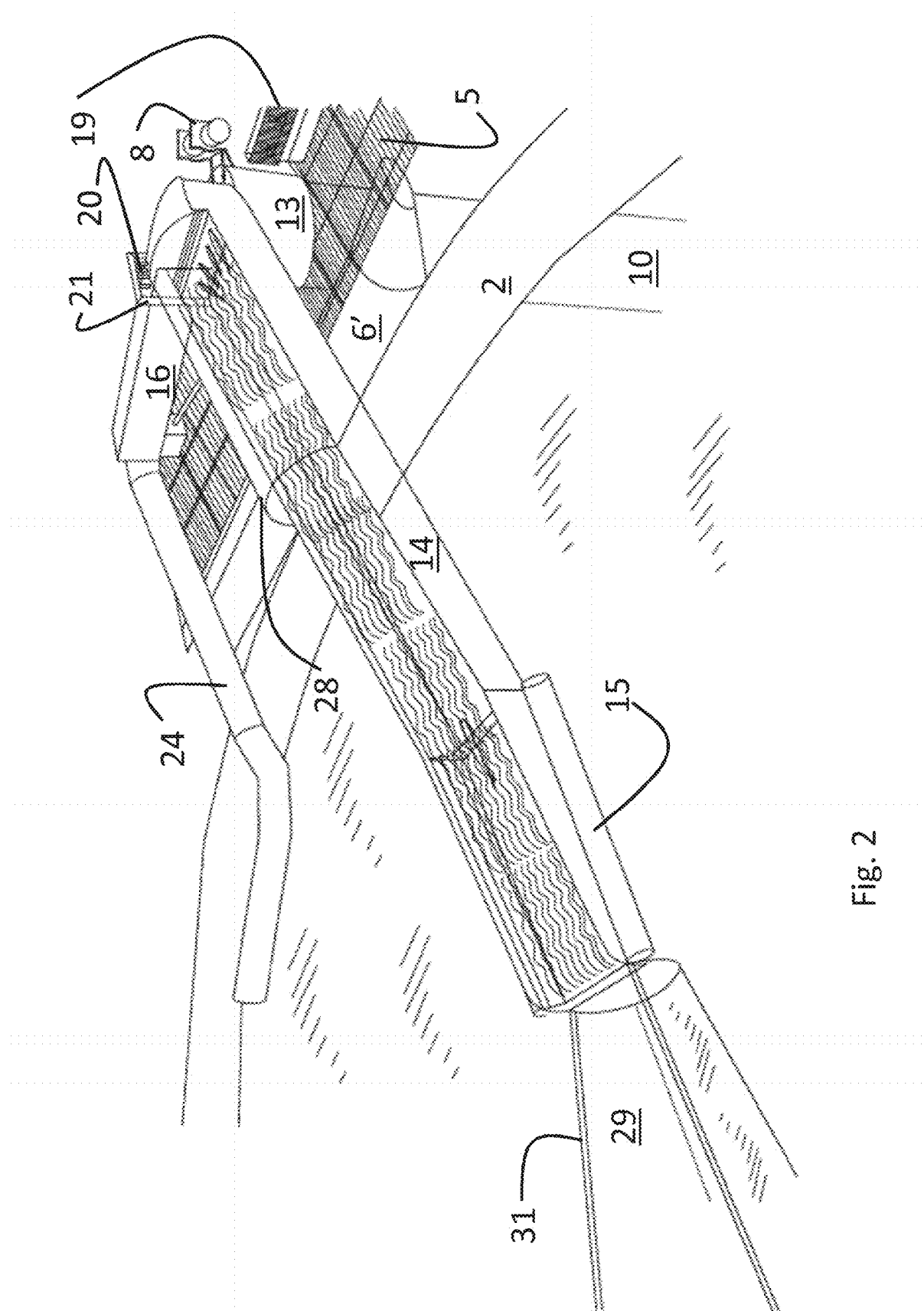
FIG. 2 is a perspective view of a net cage and a device according to the present invention.
Figure 3:
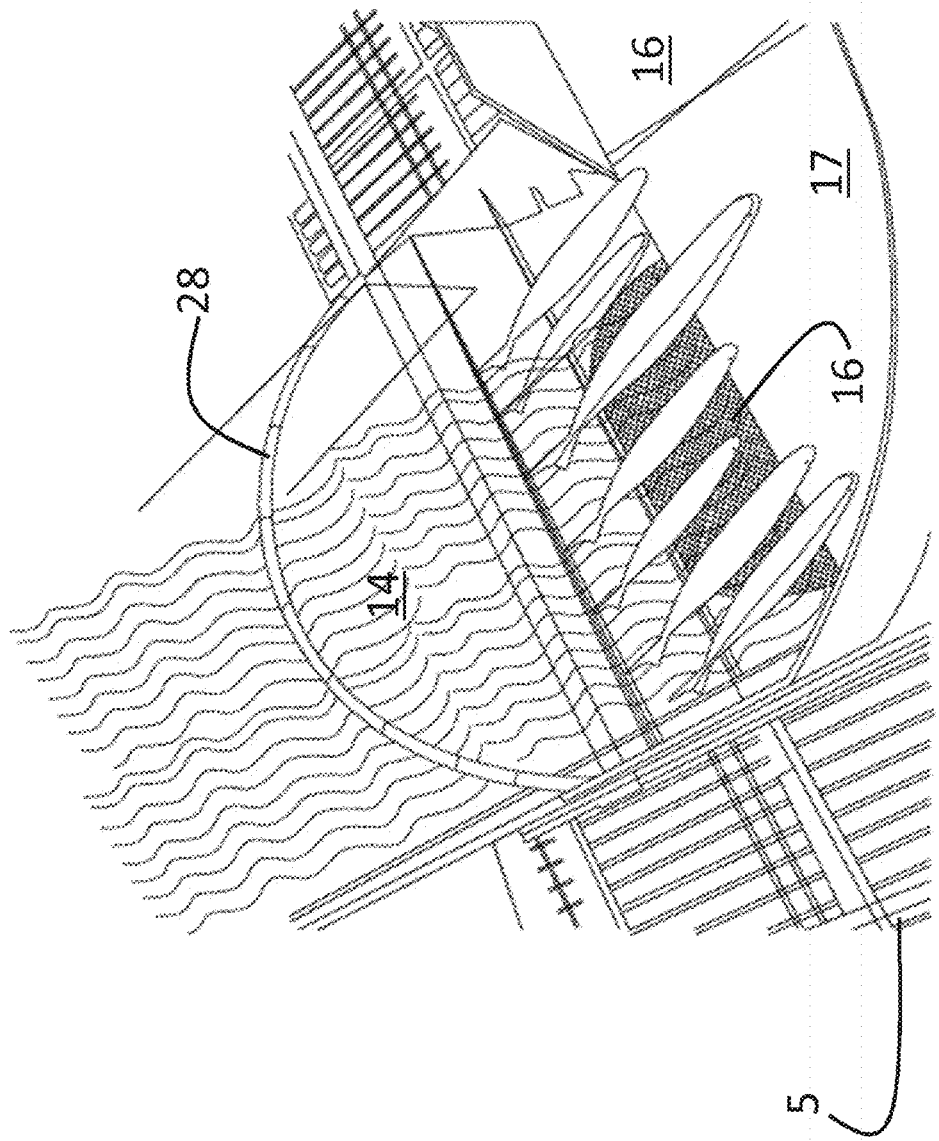
FIG. 3 is a detail view of a separation part of the present invention.
Figure 4:
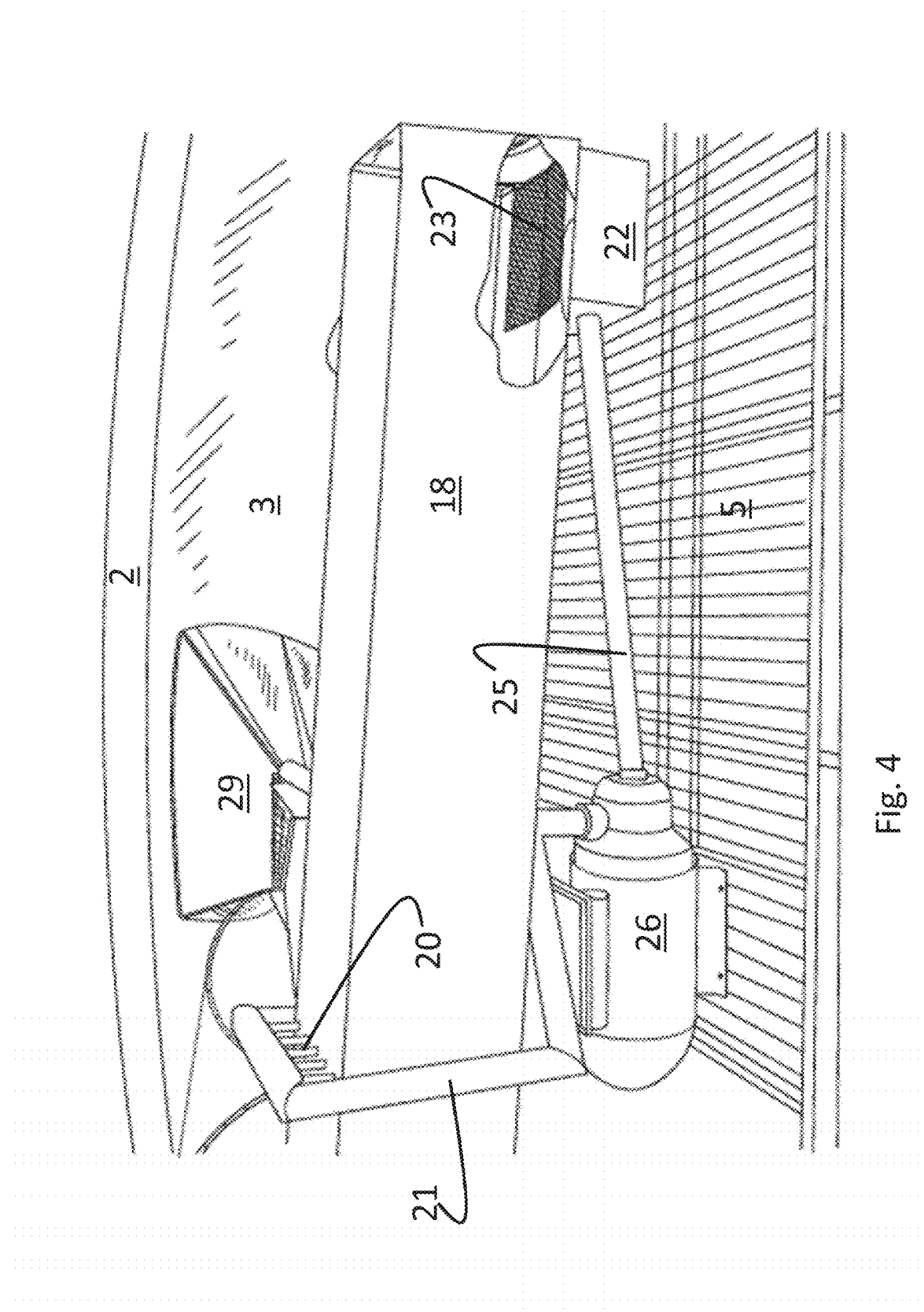
FIG. 4 is a partly cut through side view of a treatment zone of the present invention.

FIG. 1 is a side view illustrating of a net cage 1 and a device according to the present invention. A ring shaped floater 2 connected to a bag-shaped net 3 forms the basic part of the net cage 1. The skilled person will know that a net cage will normally comprise additional elements, which are irrelevant for the understanding of the present invention.

A device according to the present invention is arranged on a float 4. The illustrated float 4 is a catamaran comprising a deck structure 5 connecting two hulls 6, 6'. The float 4 may also comprise propulsion means, indicated by two outboard motors 7. The float 4 forms a basis and support for the present device. The skilled person will understand that the float 4 may be a small vessel as illustrated, or a larger vessel. It is also possible to arrange a device according to the present invention permanently or temporary on a structure connected to the ring shaped floater 2.

A tube 10 is arranged substantially vertically downwards from the deck structure 5. The tube 10 is preferably made of a flexible material, such as tarpaulin material, or tarp, for easy uptake and putting out of the tube for transport of the device, as will be further described below. Preferably, rings or a helix of metal or any other suitable material are/is preferably attached to the flexible tube material to prevent that the tube collapses in use. At its lower end, the tube is held in down by means of a weight body 11. The illustrated weight body 11 is a ring shaped body, which also is arranged to keep the lower opening of the tube 10 open. Lifting wires 9 are in their lower ends connected to the weight body and are connected to the lower end of the tube 10. The lifting wires 9 are arranged inside the tube 10 or are arranged in channels in the tube walls. The lifting wires are connected to a winch 8 at the floater for lifting and lowering of the tube 10.

An air tube 12 is also arranged from an air compressor at the deck structure 5 to a position below the lower opening of the tube 10, ending in one or more nozzle(s) as air distributors arranged so that the air raises towards the water surface through the tube 10. The illustrated air tube 12 is arranged inside the tube 10 and is lifted or lowered together with the tube 10.

A compressor 19 is arranged on the floater for production of compressed air for the air tube 12. The air is released immediately below the lower opening of the tube 10. The air streaming upwards inside of the tube 10 will cause water to flow upwards together with the air and will lift the resulting water column above the sea level to a level depending on the airflow. The upper opening of the tube 10 is connected to a water inlet 13 at the deck structure 5 for introduction of the water into a duct 14, arranged from the water inlet 13 and ending below the water surface inside of the net cage as an artificial river. The duct 14 is preferably held in the required angle to the water surface by means of pontoons 15 connected to the duct and floating at the water surface.

Fish like trout, salmon, and char, and relatives thereof living at least parts of their life in fresh water in the wild tend to swim against a current caused by flowing water, and more so if the incoming streaming water is more oxygen rich than the surrounding water basin. The water flowing down the duct is oxygen rich due to the use of the above-described "air pump" action. Additionally, as the water withdrawn from a depth, such as e.g. 10 to 100 meters, such as 20 to 50 meters, normally is colder than the water close to the water surface, even more oxygen may be dissolved in the water. The length of the tube 10 is adjusted to the preferred depth for taking in water at the place of use.

The skilled person will understand that the present method and device is not dependent on the use of the above described "air pump" action, and that any other convenient pump may be used without leaving the scope of the invention. The air driven pump as described above where water is caused to flow upwards in the tube 10 by countercurrent flow with air blown into the tube, is the presently preferred pump as it is simple and adds oxygen to the water. If mechanical pumps are used, air or oxygen might be added to the water before introduction into the duct 14.

Provided that the fish in the cage net is of a species attracted to running, and oxygen rich water, the fish in the net cage will be attracted to the flowing water in the duct and will start swimming upwards the duct. It is assumed that an inclination of the duct of about 0.2% to about 5%, i.e. an inclination of 0.2 cm per meter, to 5 cm per meter from the sea level to the top of the duct. It is assumed that the most preferred inclination will be from about 0.4 to 3%, such as 0.5 to 2.5%, dependent on the fish species to be taken up.

The water inlet 13 is connected to the duct 14 so that the water is directed into the duct. A separation plate 17 is arranged at a level above the level of the streaming water to avoid the upcoming water to flow in any other direction. A grating 16 is arranged to prevent the fish from swimming down into the tube 10 and to lead the fish up on the separation plate 17. The grating is inclining upwards from the upper end of the duct, so that fishes swimming upwards the duct 14 are lifted up by means of their own speed and the tilted grating 16 onto the separation plate 17.

The fish entering the separation plate 17 has a speed sufficient to slide over the separation plate and into a processing duct 18. The processing duct is preferably slightly obliquely arranged so that the incoming fish slides from the separation plate 17 downwards the processing duct 18. The inclination of the processing duct may be from about 0.1 to 2%, such as from 0.2 to 1% from separation plate towards the sea level. Fish entering the processing duct will normally move through the processing duct by the speed at which they enter the processing duct and their own swimming movement so that only a small inclination as indicated is necessary for the fish to move through the processing duct. The length of the processing duct is adopted to allow for the required process step(s) to be performed in the processing duct. Dependent on the needs and specific setup, different processing steps may be performed as the fish passes through the processing duct. Additionally, or alternatively, the fish may be led from the processing duct into specific treatment sections to ascertain that the treatment is finalized.

The skilled person will understand that a duct with grating at its bottom part may be arranged between the separation plate 17 and the processing duct 18 for further separation of water from the fish, if needed.

The embodiment illustrated in the figures includes equipment for treatment of the fish by spraying the fish with relevant chemicals. The chemicals in question may e.g. be chemicals for treatment against salmon louse or other parasites or illnesses.

For such treatment, an aqueous solution of the relevant chemical(s) is introduced through spraying nozzles 20 arranged on a nozzle tube 21 above the fish sliding through the processing duct. A collection sump 22 covered by a grid 23 to allow water and chemicals is arranged in the bottom of the lower end of the processing duct, to collect water and chemicals and reduce the release of chemicals into the surroundings. The fish slides at the top of the grid 23 and into a fish outlet tube 24.

A chemicals outlet tube 25 is connected to the sump for withdrawing the used aqueous solution of chemicals for the treatment. The used solution may be recirculated into the nozzle tubes 21 and nozzles 20 by means of a treatment liquid pump 26. A not shown bleed tube is preferably arranged to withdraw a part of the solution collected in the sump for deposition. Additionally, a not illustrated chemicals addition tube connected to a chemicals tank is preferably provide to add chemicals to the circulating treatment liquid to substitute loss of chemicals, to adjust the concentration of chemicals in the circulating liquid due to dilution thereof by water following the fish, and to substitute loss of chemicals and any bled off of chemicals.

The skilled person understands that parts or all of the duct 14, separation plate 17 and/or the processing duct 16 is covered, to avoid that any of the fishes escapes over the edges of the duct or further parts of the device. A cover 28 is illustrated over a part of the duct 14.

The illustrated fish outlet tube is arranged to release the treated fish into the same cage net from which it was taken up. The skilled person will understand that the fish outlet tube 24 can be arranged to release the treated fish into a different cage net, to ascertain that all the fish in one cage net to be treated is treated, and that only the treated fish is released into the other cage net.

The skilled person will also understand that the processing duct are applicable here. In addition to, or instead of, a chemical treatment, the fish may be measured, weighted, sorted into different cage nets or other tanks, etc. The skilled person will be able to identify the relevant equipment for such operations and to make addition to the embodiment described herein without departing from the invention as defined in the claims. If the processing duct comprises separation means based on parameters such as weight, length etc. of the fish, more than one fish outlet tubes may be provided for leading and releasing the sort fish into different cage nets, tanks, etc.

The processing duct may also comprise equipment for removing parasites at the outside of the fish, such as salmon louse by spraying with water or an aqueous solution. One possibility is here to include sensor equipment for identifying parasites to use spraying equipment targeting the individual parasite for removing them from the fish without damaging the fish. The skilled person will also understand that separator plates for aligning the fish may be an advantage for such spraying to reduce the sideways movement of the fish, movement that may do the spraying less efficient or less targeted to the parasite.

The present method may also be used for medical treatment, such as individual injections in the fish and/or for tagging of the fish by injecting an identifiable tag, such as a RFID. Methods for injections of smolt is known in the art. Such injections will presumable require using alignment devices so that the fish is introduced individually into injection section(s). As soon as the fishes are aligned and individually separated from each other, they may also be weighted, scanned, sorted etc.

One other possible use for the present invention may be for taking up fish to be slaughtered. The above-described processing duct may then be substituted by equipment for slaughtering of the fish, or the fish outlet tube 24 may lead the fish directly into a plant for slaughtering of the fish, or into a tank for transport of the fish to be slaughtered.

A collection net 29 shaped as a half funnel having its smallest opening towards the lower end or the duct 14 may be connected to the lower end of the duct 14, and opening into the water inside the cage net. The collection net 29 will assist in leading the fish from the cage net into the funnel 14. Collection net floaters 31 are arranged at the sides of the collection net to keep the sides of the collection net floating at the surface as illustrated in the figures.

The duct 14 is preferably pivotally arranged on the float 4, so that it may be placed onto the deck 5 for transport. The duct 14 may also be divided into separate sections that may be separated for transport, or may be telescopically adjustable for transport. The fish outlet tube is also preferably arranged so that it may be taken onboard the float for transport. The skilled person will also understand that the tube 10 is winded up and out of the water for transport.

The skilled person will understand that the present device for taking up fish may be arranged on a separate vessel as illustrated and described above, or the device or parts thereof may be arranged at the cage net floater.

Even though the invention has been described with reference to a fish farm and cage nets, the skilled person will understand that the present method and device may be used for other purposes, such as taking up fish for treatment, control, scientific purposes etc. in any relevant body or water. Accordingly, it is also assumed that the present device and method may be of use for taking up fish in the wild during migration of fish where fish density normally is high, or for catching fish that has escaped from a fish farm e.g. due to damage or breakdown of a cage net or the like.

The invention claimed is:

1. A method for taking fish up from a body of water, the method comprising:
    providing a duct having a lower open end below the water surface and an upper open end arranged at a floating working platform above sea level;
    introducing water into the duct from the upper open end to give a water stream from the upper open end of the duct to the lower open end of the duct;
    allowing the fish to swim up in the duct against the water stream therein; and
    wherein the incoming water is directed to flow into the duct and the fish is separated from the flowing via a grating inclining upwards from the top end of the duct to a separation plate arranged above the water level in the duct.

2. The method according to claim 1, wherein the fish is led from the grating to the separation plate by its own swimming speed and is led further from the separation plate into a processing duct.

3. The method of claim 2, wherein the fish is sprayed with chemicals in aqueous solution in the processing duct.

4. The method of claim 2, wherein the fish is sorted according to present parameters in the processing duct.

5. The method of claim 2, wherein the fish, after at least one of being sprayed with chemicals and sorted, are introduced into at least one of one or more cage nets and containers.

6. The method of claim 1, wherein the fish is led further into a facility for slaughtering of the fish.

7. The method according to claim 1, wherein the body of water is body of water inside of a sea farm enclosure.

8. The method of claim 7, wherein the sea farm enclosure is a cage net.

9. A device for taking up fish from a body of water, the device comprising:
    a duct arranged connected to a floating working platform above sea level where the duct is arranged to be placed with a lower open end below the surface of the water and an upper open end arranged at the working platform;
    a water source for introducing water into the duct at the upper open end of the duct to give an artificial waterfall through the duct; and
    wherein a grating is arranged upwards inclining from the upper end of the duct to a separation plate arranged above the water level in the duct, for leading the swimming fish from the duct onto the separation plate.

10. The device according to claim 9, wherein the water source is a pumping arrangement is arranged for pumping up water from a depth and introducing the water into the duct.

11. The device of claim 10, wherein the water pumping arrangement comprises a vertically arranged tube that at is upper end is connected to a water inlet for introduction of water into the duct, and is open in its lower end, and where an air tube is arranged for introduction of air into the lower open end of the tube.

12. The device of claim 9, wherein the device further comprises a processing duct for processing of the fish.

13. The device according to claim 12, wherein the processing duct comprises spray nozzles for spaying of fish with aqueous solutions of chemicals.

14. The device according to claim 12, wherein the processing duct comprises detectors for measuring at least one of weight, size, and number of the fish passing through the processing duct.

15. The device according to claim 12, wherein the processing duct comprises equipment for injecting at least one of medicine and identification markers into the fish.

* * * * *